Figure 1:
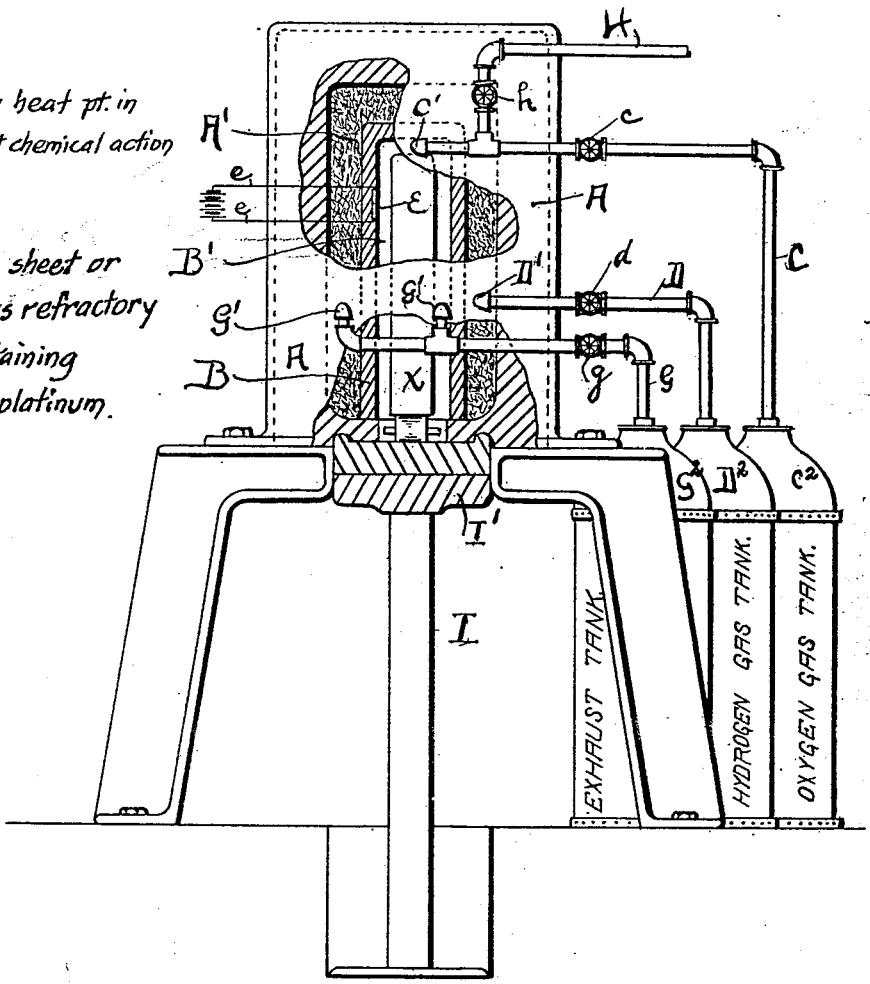

No. 859,259. PATENTED JULY 9, 1907.
E. C. SMITH.
METHOD OF HEATING FURNACES.
APPLICATION FILED APR. 13, 1900.

2 SHEETS—SHEET 1.

E = Heater to heat pt. in lining to start chemical action

B = Platinum sheet or wall of porous refractory material containing finely divided platinum.

Witnesses
J. A. Vernon
Annetta McCormack

Eugene C. Smith, Inventor

No. 859,259. PATENTED JULY 9, 1907.
E. C. SMITH.
METHOD OF HEATING FURNACES.
APPLICATION FILED APR. 13, 1900.
2 SHEETS—SHEET 2.
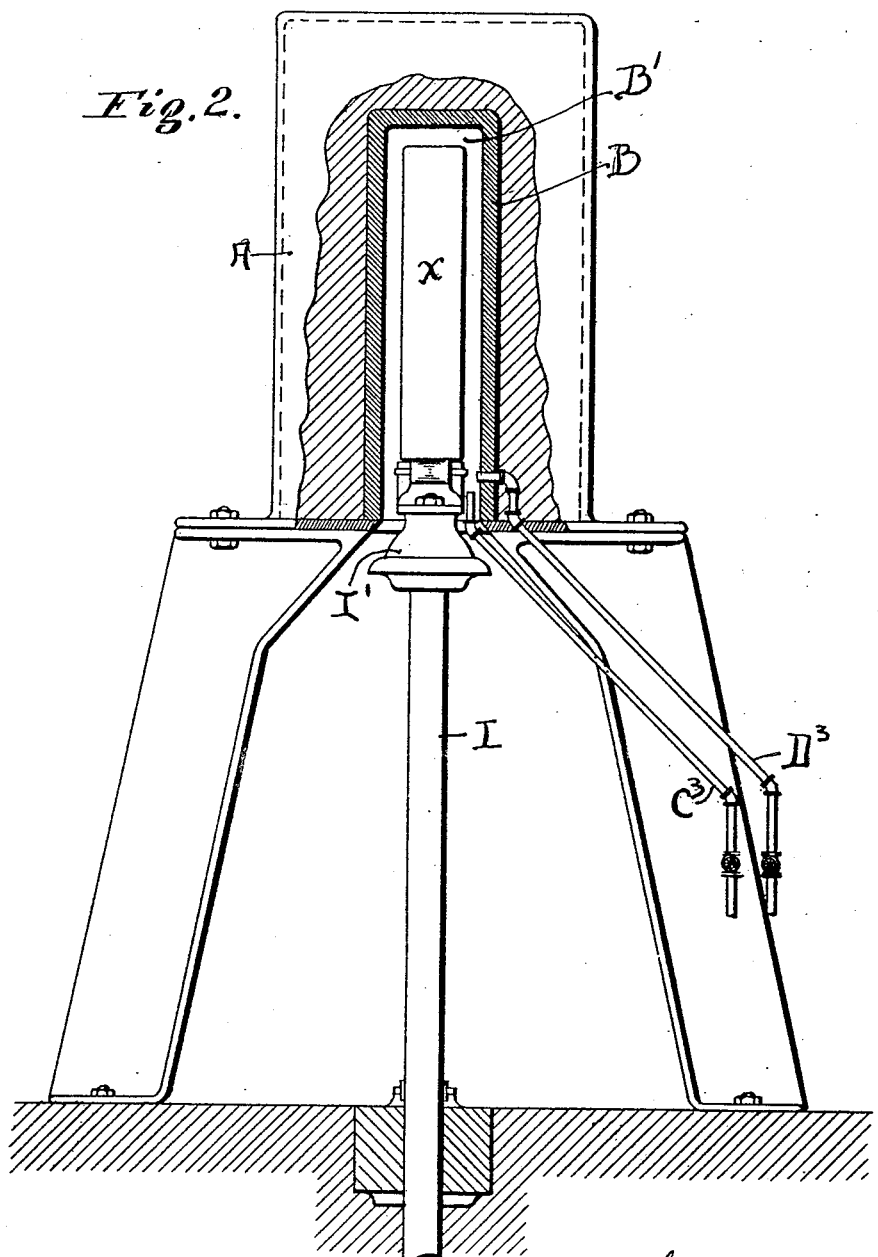

UNITED STATES PATENT OFFICE.

EUGENE C. SMITH, OF NEW YORK, N. Y.

METHOD OF HEATING FURNACES.

No. 859,259.　　　　Specification of Letters Patent.　　　　Patented July 9, 1907.

Application filed April 13, 1900. Serial No. 12,781.

*To all whom it may concern:*

Be it known that I, EUGENE C. SMITH, a citizen of the United States, and a resident of New York, county of New York, State of New York, have invented a certain new and useful Method of Heating Furnaces, of which the following is a specification.

My invention relates to a method of heating furnaces and particularly to gas furnaces wherein billets, blooms, forgings, or other already shaped material is reheated to a degree necessary for the subsequent operations of rolling, forging, tempering, or other manipulations.

In the drawings and description to follow I have shown my invention as applied in one of its simplest forms.

Figure 1 is an elevation partly in section of a vertical heater or furnace. Fig. 2 is an elevation partly in section of my furnace as constructed for the burning of any of the common hydrocarbons in place of pure hydrogen and of any common gas containing oxygen, as air.

My invention lies broadly in the method of heating furnaces which consists in placing therein platinum, either in a finely divided state or in plates or films, and then bringing oxygen or hydrogen gases into contact with the platinum, whereby a continuing series of oxidations and reductions take place as the particles of platinum come in contact with the oxygen and hydrogen alternately; the chemical action thus going on heating the platinum to a degree dependent upon the length of time the action is allowed to continue and thereby heating said billets and blooms, etc.

In the drawings, A is the inclosing wall of a furnace or heater, made of refractory material such as fire-brick, carbonate of magnesia, or any other non-conductor, and surrounding the chamber A'. Within the chamber A' is the heating chamber B' whose walls B are preferably made of some porous refractory non-conducting substance, with which finely divided platinum has been incorporated. This heating chamber may be made of sheets of platinum if preferred, the sheets used being sufficiently porous to allow the passage of gas from A' to B'.

C is a pipe leading from a tank $G^2$ containing oxygen gas to an outlet C' within the heating chamber B'.

D is a pipe connecting a hydrogen gas tank, $D^2$ with the outer chamber A', the outlet being at D'. Instead of the tanks $C^2$ $D^2$ any other source of supply may be used.

*c* indicates electric wires leading to a resistance E embedded in the walls B of chamber B'.

With as much of the apparatus as has been heretofore described, the operation of heating the furnace is as follows: The valves *c d* are opened to allow the oxygen and hydrogen gases to pass into the chambers A' B' where, as the walls B are porous, the gases commingle and come in contact simultaneously with the finely divided platinum incorporated therewith, whereby a continuous series of oxidations and reductions take place as individual points or particles of the metal come in contact first with the oxygen and then with hydrogen. Heat is evolved by this chemical action and this rise of temperature accelerates the alternate oxidations and reductions of the platinum, which becomes ultimately incandescent. This state can be maintained so long as the mixed gases are supplied to the furnace.

As I have before stated, the mere contact of hydrogen and oxygen will eventually heat the metal to the degree desired, but such chemical action is greatly accelerated by the presence of some local heating point or points from which the chemical action can start and spread. Therefore I use a resistance E embedded in the walls B and connected by *e* to a current generator, which when the current is turned on gives sufficient heat to the platinum to start the chemical action at that point immediately whereby the adjacent portions become heated and are very quickly acted upon by the gases.

To assist in cooling the furnace I provide it with an exhaust tube G having inlets G' G' on the inside and outside of chamber B' and connected to the exhaust tank $G^2$ or other suitable exhaust which, when the valve *g* is opened and the valves *c* and *d* closed, draws off the hot air and gases immediately.

In order to clean the face of the wall B of the chamber B', I provide the vapor pipe H which has an outlet in said chamber. I have shown it as connected to the oxygen pipe C though this is merely for convenience. When it is necessary to cleanse the furnace from impurities that may collect upon its active face, I force through the pipe H the vapor of sulfuric, hydrochloric, or nitric acid or steam, the kind of vapor depending upon the impurities to be solved out.

I is a plunger carrying the platform I'. On this platform rests the billet X to be acted upon. The plunger and platform are raised by any suitable means until the billet is within the furnace. The gases are turned on and the billet being insulated from the outside air, soon becomes charged with heat from the incandescent walls B. When the desired heat has been given to the billet or plate, the platform is lowered, the billet removed, and another billet placed in position and the operation repeated.

If it is desired to suddenly cool the billet or plate while it is in the furnace, all that is necessary is to turn off the oxygen and hydrogen gases, open the exhaust pipe whereby the heated gases are drawn off, and introduce cold gases or vapor to the chambers in any obvious manner.

The merit of my invention lies in the fact that a much larger amount of work is obtained in proportion to the fuel consumed than in any other gas, liquid or solid fuel furnace. Every particle of the hydrogen and oxygen gas does its work in heating the interior chamber; there is no stack and therefore none of the heat can escape that way and as the outside walls are of non-conducting material, the heat is confined and concentrated upon the work in hand. When my method of heating is used, the furnace can be small and compact and adapted in shape to any need and to fit any special form of bar, plate or billet. There are no unconsumed products of combustion either in the form of smoke or ashes.

It may be that in place of pure oxygen and pure hydrogen I may desire for the sake of economy to use some hydrocarbon containing hydrogen, and in place of pure oxygen some mixed gas such as air containing oxygen. This I could do in the furnace shown were it not that there are no outlets for the unconsumed products of combustion. In Fig. 2 I have shown a furnace particularly adapted for such a case. A is the outer wall of refractory material and having an inner face B of platinum or platinum incorporated with other substance; the chamber B' is for the reception of the billet as before described. The platform I' which the billet rests, however, does not close the bottom of chamber B. Pipes C''' and D''' supply, one some impure gas containing hydrogen, as ordinary illuminating gas, and the other a gas containing oxygen, as for instance ordinary air. The gases issuing from pipes C''' D''' are forced into the one end of chamber B, come in contact with the platinum in its passage around the chamber, heating the same, and the residue that is unconsumed passes out at the other side, as shown by the arrows.

I have shown my method of heating furnace in its general application and also as applied in a specific case, but it is to be understood that I do not wish in any manner to limit myself thereto, as a great number of different forms might be used without departing from the spirit of my method; the forms shown are purely for illustrative purposes and the method itself may be applied to a very large range of work; nor do I wish to be limited to any of the details illustrated as they are susceptible of great variation and I have only suggested them to render my invention understandable.

I have shown for the sake of simplicity an electric wire and resistance for starting the action of the gases. I do not desire to limit myself to this means as any other means of starting incandescence may be used.

The space A' between the outer and inner walls A B may, if necessary, be filled with any granulated porous material, such as pumice stone, or with fine wire gauze to prevent any back flash and explosion of gas. Both gases may be turned in on the platinum face of wall B as shown in Fig. 2, or into the outer chamber or either gas into either chamber, as I may see fit.

While I have stated that I use for the heating chamber walls of refractory material impregnated or incorporated with finely divided platinum, I wish it understood that I may also use plates or walls made entirely of porous platinum or covered with a film of platinum; the gist of my invention lying in the method of heating, which consists in placing platinum adjacent to the work to be heated and then bringing the hydrogen and oxygen in contact with the platinum and thus raising the temperature of the platinum to incandescence, as more definitely stated in the claims following.

Any compound gas containing hydrogen and any such gas containing oxygen may be used in place of the pure gases.

The platinum in walls B may be heated before the introduction of the hydrogen and oxygen gases instead of afterwards, as I have described it. I referred to the introduction of the gas as being first in the description and claims simply for clearness.

Having described my invention, what I claim is:

1. A method of heating furnaces which consists in placing therein a catalytic agent, introducing into the furnace two gases which shall chemically combine with each other in the presence of said agent, preventing the combination of said gases except in contact with the catalytic agent and so regulating the flow of both gases to the catalytic agent that they will immediately combine one with the other and leave no free gas in contact with the said catalytic agent.

2. A method of heating objects which consists in inclosing them within a casing together with a catalytic agent, then admitting to the interior of the casing gases which shall chemically combine with each other in the presence of the catalytic agent, regulating the flow of said gases to the interior of the casing to such degree that there shall at no time be more of said gases free than the catalytic agent has power to chemically combine, and raising the temperature of the interior of said casing through said chemical combinations.

3. A method of heating furnaces which consists in placing therein a catalytic agent, introducing separately into the furnace and separately into contact with the said agent two gases which shall chemically combine with each other, bringing said gases into contact with each other and with the agent at the same time, and raising the temperature of said agent by said chemical combination.

4. The method of heating furnaces which consists first in placing therein porous platinum, and second in forcing into said furnace against said platinum a gas containing oxygen and a gas containing hydrogen in such proportions to the platinum that the gases will not ignite, and thereby raising the temperature of the furnace to the degree of heat required by the chemical action caused by the contact of the said gases and the platinum.

5. The method of heating furnaces which consists first in placing therein porous platinum, second in forcing into said furnace against the said platinum gases containing oxygen and hydrogen in such proportions to the platinum that the gases will not ignite, third starting the catalytic action by the application of heat to the platinum and thereby raising the temperature of the furnace by the catalytic action set up by the contact of the said gases with the platinum.

6. A method of heating furnaces which consists in separately bringing oxygen and hydrogen before any admixture into the presence of a catalytic agent, heating said catalytic agent, allowing said separate gases to chemically combine in the presence of said heated catalytic agent, and raising the temperature of the said agent by said combination.

7. A method of heating furnaces, which consists in placing therein platinum in a finely divided state and introducing oxygen and hydrogen into separate parts of the platinum and effecting their combination by the action of the platinum, thereby preventing the contact of the two gases except in presence of the platinum.

8. A method of heating furnaces, which consists in forcing oxygen and hydrogen gases into said furnace, interposing porous platinum between said gases and raising the temperature of the platinum by the chemical action caused by the contact of the said gases and the platinum to the degree required.

9. A method of heating furnaces which consists in bringing a gas through a porous partition into the presence of another gas which shall chemically combine with the first gas, and raising the said partition to incandescence by such combination.

10. A method of heating furnaces which consists in forcing a gas through a heated porous partition into the presence of another gas, the two gases being so proportioned to each other that they will combine instantaneously and entirely, and raising the temperature of said partition at the point of contact by such chemical combinations.

11. A method of heating furnaces which consists in separately bringing before admixture hydrogen and oxygen in the presence of a catalytic agent, allowing said gases to chemically combine in presence of said agent and raising the temperature of the agent by the heat of such chemical combinations.

Witness my hand this 9th day of April, 1900.

EUGENE C. SMITH.

In presence of—
PAUL GROUT,
JAS. CROOKE MCLEER.